(12) United States Patent
Soeda et al.

(10) Patent No.: US 6,592,916 B2
(45) Date of Patent: *Jul. 15, 2003

(54) EDIBLE MICROCAPSULE AND FOOD CONTAINING THE SAME

(75) Inventors: Takahiko Soeda, Kanagawa (JP); Masayuki Nakanishi, Kanagawa (JP); Tsuguo Inoue, Kanagawa (JP)

(73) Assignees: Ajinomoto Co., Inc., Tokyo (JP); Japan Capsular Products, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/198,964

(22) Filed: Jul. 22, 2002

(65) Prior Publication Data

US 2003/0008040 A1 Jan. 9, 2003

Related U.S. Application Data

(63) Continuation of application No. 08/780,222, filed on Jan. 8, 1997, now Pat. No. 6,475,542.

(30) Foreign Application Priority Data

Jan. 8, 1996 (JP) .............................................. 8-000850
Dec. 12, 1996 (JP) .............................................. 8-332315

(51) Int. Cl.$^7$ .......................................... A23L 1/0562
(52) U.S. Cl. ........................ 426/98; 426/531; 426/576; 426/650; 424/492; 427/213.3; 427/213.32; 427/213.35
(58) Field of Search .................. 426/98, 576, 650, 426/531; 424/454, 456, 492; 427/213.3, 213.32, 213.35

(56) References Cited

U.S. PATENT DOCUMENTS

| | | |
|---|---|---|
| 2,886,440 A | 5/1959 | Kramer et al. |
| 2,886,445 A | 5/1959 | Rosenthal et al. |
| 2,886,449 A | 5/1959 | Rosenthal et al. |
| RE24,899 E | 11/1960 | Green |
| 3,495,988 A | 2/1970 | Balassa |
| 3,639,259 A | 2/1972 | Scarpelli |
| 3,886,084 A | 5/1975 | Vassiliades |
| 3,985,913 A | 10/1976 | Johnson et al. |
| 4,276,312 A | 6/1981 | Merritt |
| 4,280,954 A | 7/1981 | Yannas et al. |
| 4,489,971 A | 12/1984 | Martinez, Sr. |
| 4,597,959 A | 7/1986 | Barr |
| 4,615,889 A | 10/1986 | Fu Lu et al. |
| 4,753,806 A | 6/1988 | Carroll et al. |
| 4,917,904 A | 4/1990 | Wakameda et al. |
| 5,002,785 A | 3/1991 | Lew |
| 5,004,595 A | 4/1991 | Cherukuri et al. |
| 5,021,248 A | 6/1991 | Stark et al. |
| 5,037,664 A | 8/1991 | Kyogoku et al. |
| 5,055,310 A | 10/1991 | Nonaka et al. |
| 5,093,028 A | 3/1992 | Kyogoku et al. |
| 5,098,733 A | 3/1992 | Kyogoku et al. |
| 5,145,702 A | 9/1992 | Stark et al. |
| 5,156,956 A | 10/1992 | Motoki et al. |
| 5,182,130 A | 1/1993 | Haralampu et al. |
| 5,271,961 A | 12/1993 | Mathiowitz et al. |
| 5,279,839 A | 1/1994 | Gottmann et al. |
| 5,330,778 A | 7/1994 | Stark et al. |
| 5,518,742 A | 5/1996 | Soeda et al. |
| 5,525,367 A | 6/1996 | King et al. |
| 5,532,004 A | 7/1996 | Bell et al. |
| 5,658,605 A | 8/1997 | Soeda et al. |
| 5,759,599 A | 6/1998 | Wampler et al. |
| 5,830,493 A | 11/1998 | Yokota et al. |
| 5,885,630 A | 3/1999 | Zurawski et al. |

OTHER PUBLICATIONS

Database WPI, Section Ch. Week 9018, Derwent Publications Ltd., AN 90–137092, XP002094479 & JP02086741 A (Ajinomoto KK), Mar. 27, 1990, Abstract.

Database WPI, Section Ch. Week 9420, Derwent Publications Ltd., AN 94–163945, XP002094480 & JP06107696 A (Sogo Yakko KK), Apr. 19, 1994, Abstract.

Database WPI, Section Ch. Week 9239, Derwent Publications Ltd., AN 92–319230, XP0020944781 & JP04 222559 A (Ajinomoto KK), Aug. 12, 1992, Abstract.

*Primary Examiner*—Nina Bhat
(74) *Attorney, Agent, or Firm*—Oblon, Spivak, McClelland, Maier & Neustadt, P.C.

(57) ABSTRACT

An edible microcapsule comprising a core and a capsule wall, wherein the core is an edible hydrophobic substance, the capsule wall is formed by salting-out of a combination of a protein and an edible salt, and transglutaminase is used as a crosslinking agent for hardening (solidifying) the capsule wall, and a food containing the edible microcapsule.

23 Claims, No Drawings

EDIBLE MICROCAPSULE AND FOOD CONTAINING THE SAME

This application is a Continuation of Ser. No. 08/780,222, filed Jan. 8, 1997 now U.S. Pat. No. 6,475,542.

FIELD OF THE INVENTION

The present invention relates to edible microcapsules suitable for dried powders and foods containing the same.

BACKGROUND OF THE INVENTION

Edible microcapsules containing a hydrophobic core substance, such as fat-soluble vitamins (e.g., vitamin A, vitamin D and the like), flavor oils, and fats and oils or fatty acids (e.g., eicosapentaenoic acid (hereinafter referred to as "EPA"), docosahexaenoic acid (hereinafter referred to as "DHA") and the like) and the like, are essentially required to be in the form of dried powder from the standpoint of preservation stability.

The state-of-the-art microcapsules having a small particle size of not larger than 100 μm are obtained by spray drying with a spray dry apparatus. This method has been utilized, in general, for granulating a liquid composition into fine particles. When microcapsules are prepared according to this method, a dispersing solution in which a hydrophobic core substance, such as a flavor oil, a fatty acid or the like, is emulsified in an aqueous solution of a coating substance, such as gum arabic, dextrin or the like, is prepared, and the obtained dispersing solution is spray-dried in a high-temperature air stream to obtain powder particles of microcapsules. This method is characterized in that the dispersing solution is made into fine droplets having a large total surface area by spray drying into a high-temperature air stream, thereby assuring an increased drying effect. Accordingly, the method is rather suitable to prepare powder particles having a particle size of not larger than 100 μm, preferably the order of several tens of microns.

For preparing large particles having a particle size of not smaller than 1,000 μm, on the other hand, a so-called orifice method using a double orifice (with a structure providing an inner orifice within an outer orifice of relatively larger calibre) has been put to practical use, in which a liquefied capsule wall-forming substance are fed under pressure into the outer orifice and then extruded therefrom hugging its calibre, wraps around a droplet of the core substance are dripped out of a nozzle at the outlet of the inner orifice, and the thus wrapped up droplets are dropped into an oil bath for cooling and hardening (solidifying) the capsule wall, and the thus made microcapsules are collected from the oil and further dried.

Apart from the above-described two methods that have been in practical use, coacervation has been attracting attention as a technique for obtaining edible microcapsules having a particle size of about 100 to 400 μm, which size is the most suitable for addition to foods. Coacervation is divided into two methods, i.e., complex coacervation and simple coacervation. Salting-out is included in simple coacervation. Complex coacervation consists in coacervation (phase separation) induced by the electrolytical action between polycations and polyanions, which causes separation of a polymer rich phase out of the equilibrium liquid with subsequent precipitation and adsorption around surface of the droplets of a hydrophobic core substance to form a capsule wall. Examples of edible combinations of polycations and polyanions include gelatin-gum Arabic, gelatin-CMC Na, and gelatin carrageenan.

The outline of encapsulation by complex coacervation is as follows.

All of the following processes are carried out under continuous agitation.
1) A hydrophobic core substance is emulsified or dispersed in a positively charged water-soluble polymer solution having the properties of a protective colloid.
2) An oppositely charged hydrophilic colloid solution is added thereto.
3) The colloid concentration, pH, temperature and the like of the system are controlled so as to induce coacervation (phase separation), thereby to precipitate a colloid rich phase of the water-soluble polymer onto the surface of the hydrophobic core substance to form a microcapsule wall.
4) The capsule wall of the resulting microcapsules is insolublized and stabilized by crosslinking.

In the step of insblublizing the capsule wall, aldehydes, such as formaldehyde, glutaraldehyde and the like, are generally used as a crosslinking agent for hardening (in the present invention, often referred to as a "crosslinking insolublizing agent"); however, they are not suitable for foods. Tannic acid, gallic acid and the like are known as a crosslinking agent for hardening applicable to foods; however, the crosslinking effect thereof is not sufficient. Moreover, some crosslinking agents for hardening usable for foods give their odor or taste to the capsule wall made of, e.g., gelatin.

Under these circumstances, the crosslinking treatment for hardening or solidifying (in the present invention, often referred to as "crosslinking insolublizing treatment") using transglutaminase, which is an enzyme disclosed in JP-A-1-27471, is remarkably superior to the above-described conventional crosslinking treatment for hardening or solidifying (the term "JP-A" as used herein means an "unexamined published Japanese patent application"). Application of transglutaminase as a crosslinking agent for hardening or solidifying of a capsule wall to edible microcapsules obtained by coacervation has been already reported (see JP-A-5-292899).

Spray drying using a spray dry apparatus is a very old technique that has been in large practical use. It has been utilized in powdering skim milk since the early twentieth century (Nihon Funtai Kogyo Gijyutu Kyokai (ed.), *Granulating Handbook*).

With the broadening of application, the spray dry apparatus has increased in speed and automation, and the technique has been in wide use as a means for finely granulating a liquid substance.

Spray drying has the following characteristics: (1) powder particles can be obtained directly from a liquid substance; (2) a liquid substance is made into fine droplets having a large surface area by the jet of a liquid substance from a pressure nozzle or the centrifugal force of a high-speed rotary disc, thereby to increase the drying efficiency; and (3) spray drying is suitable for continuous mass production. Therefore, spray drying is a very reasonable technique for finely granulating a liquid substance.

However, dry-powdered products obtained by spray drying comprise many hollow spherical particles. As is understood from the attributes of the process, it is difficult to obtain dried powder particles of microcapsules in which individual particles of a core substance are completely enveloped (encapsulated) with a continuous wall even if a suspension in which the core substance is emulsified in the encapsulating material solution is dry-granulated. Furthermore, if the capsule wall obtained by spray drying is required to have some protecting properties, the wall material should be used in a proportion of 70 to 80% based on the microcapsules, which means that the amount of the core substance is very small.

In the orifice method using a double orifice (with a structure providing an inner orifice within an outer orifice of relatively larger calibre), a microcapsule is obtained in such that a liquid wall forming substance, such as gelatin and the like, is extruded from the outer orifice, wraps around a droplet of the liquid core substance are dripped from nozzle of the inner orifice, and the wrapped up particles are dipped into an oil bath for cooling and solidifying the wall forming substance. The microcapsules obtained by this method with a subsequent process for drying are far more satisfactory than those obtained by spray drying in that the core substance is completely wrapped up with a continuous wall.

However, because the orifice method requires a mechanical process of feeding, extruding and dripping a liquid core substance and a liquid capsule wall substance as well to an extremely narrow calibre of the orifices with a high pressure pump, it is very difficult to obtain fine particles having a particle size of not larger than 1,000 $\mu$m and having a thin capsule wall. Mass production by the orifice method can be achieved only by increasing the number of double orifice and increasing the speed of such mechanical operations as feeding, extruding and dripping with a fine control of eventual size of a droplet come out of the orifice. This requires expensive equipment for increasing the pump pressure, and automated steps to optimize amount of the core substance and the capsule wall substance to be fed, extruded and dripped and for subsequent cooling, drying, recovering and defatting, and integrating subtle control into the automated steps.

The complex coacervation for obtaining powder particles of edible microcapsules having a particle size of 100 to 400 $\mu$m, which size gives no discomfort in the mouth, has previously been proposed in JP-A-5-292899. According to the disclosed method, the final step of drying a microcapsule slurry prepared by complex coacervation is carried out by spray drying with a spray dry apparatus for simultaneously removing water and drying in the case of obtaining edible microcapsules having a small particle size of not larger than 100 $\mu$m.

Also, for preparation of edible microcapsules having a medium particle size of not smaller than 100 $\mu$m, the step of drying by a fluidized bed method or blowing of warm or hot air is carried out after removing water of the microcapsule slurry through filtrations to obtain filter cake and dusting them with fine particle of starch powder to prevent the primary microcapsule particles from being agglomerated while drying.

Since the capsule wall of the microcapsules prepared by complex coacervation are highly swollen with water (having a high water content), the efficiency of dehydration before drying treatment is poor. Besides, the surface of the capsule wall is so sticky that a large quantity of an antiblock agent is required, but yet microcapsules in the primary particle state are hardly obtained, showing tendency to agglomeration, and the resulting product has a reduced content of the core substance.

SUMMARY OF THE INVENTION

An object of the present invention is to provide edible microcapsules which (1) have a capsule wall having a small degree of swelling (low water content), (2) are suited to dried powder because of its low stickiness being negligible, and (3) have a reduced capsule wall thickness to ensure a high content of the core substance.

Another object of the present invention is to provide foods containing the edible microcapsules.

These and other objects of the present invention have been attained by an edible microcapsule comprising a core and a capsule wall, wherein said core is an edible hydrophobic substance; said capsule wall is formed by salting-out of a combination of a protein and an edible salt; and transglutaminase is used as a crosslinking agent for hardening (solidifying) said capsule wall.

Furthermore, these and other objects of the present invention have been attained by a food comprising the above-described edible microcapsule.

Moreover, these and other objects of the present invention have been attained by a method for preparing the above-described edible microcapsule.

DETAILED DESCRIPTION OF THE INVENTION

Salting-out is one of simple coacervation techniques as described above. It is characterized by using a salt, such as sodium phosphate or the like, in place of the polyanion, e.g., gum arabic, CMC Na or the like, as used in complex coacervation.

Because the capsule wall of the edible microcapsules formed by salting-out according to the present invention has a low water content and a low degree of swelling and is therefore little sticky, the microcapsules are easily dried to provide powder of primary particles in a good yield.

By the use of a neutral to weakly alkaline salt, the system after capsule wall formation has a pH in the vicinity of neutrality, which is advantageous for transglutaminase to act as a crosslinking agent for hardening (solidifying) the capsule wall. As a result, a sufficient crosslinking effect is produced to provide a strong capsule wall affording improved protection for the core substance. The edible microcapsules of the present invention is characterized by achievements in both reduction of capsule wall thickness and increase in the highest possible content of the core substance.

In the edible microcapsules of the present invention, the edible hydrophobic substance is used as a core substance, the capsule wall is formed by salting-out of a combination a protein with an edible salt, and transglutaminase is used as a crosslinking agent for hardening the capsule wall. Examples of the protein for use in the present invention include a variety of edible proteins, such as gelatin, casein, soybean protein, corn protein, and collagen. Among these, gelatin is the most suitable for its ease of use and the highest capability of encapsulation.

Examples of the edible salt for use in the present invention include sodium chloride, sodium acetate, sodium nitrate, sodium carbonate, sodium sulfite, sodium lactate, sodium citrate, sodium sulfate, various sodium phosphates (e.g., sodium metaphosphate, sodium monohydrogenphosphate, sodium dihydrogenphosphate and the like), ammonium chloride, ammonium sulfate, potassium carbonate, calcium chloride, magnesium sulfate, iron sulfate, and zinc sulfate, and mixtures of two or more thereof. From the standpoint of ease of use and capability of encapsulation, preferred of them are sodium acetate, sodium sulfite, sodium sulfate, sodium metaphosphate, sodium monohydrogenphosphate, sodium dihydrogenphosphate, ammonium chloride, and ammonium sulfate, and mixtures of two or more thereof.

Transglutaminase is an enzyme catalyzing acyl transfer reaction between the γ-carboxyamide group of glutamine in peptide chains. Transglutaminase forms an intramolecular or intermolecular crosslinked structure ε-(γ-Glu)-Lys upon action of a lysine residue of proteins as an acyl receptor.

Transglutaminase includes calcium-independent one and calcium-dependent one, both of which can be used in the present invention. The former includes those of microorganism origin (see JP-A-64-27471), and the latter includes those of guinea pig liver origin (see JP-B-1-50382, the term "JP-B" as used herein means an "examined Japanese patent publication"), those of fish origin (see Nobuo Seki, *Nihon Suisan Gakkaishi*, Vol. 56, pp. 125–132 (1990)), factor XIII in blood and the like. Additionally, transglutaminase obtained by genetic recombination is also useful (see JP-A-1-300889, JP-A-5-199883 and the like). Although transglutaminase for use in the present invention is not limited in origin and process of preparation, the calcium-independent one that does not require calcium for expression of its activity is preferred.

The edible hydrophobic substance as a core substance is not particularly limited and includes vegetable oils, such as corn oil, soybean oil, rape seed oil, peanut oil, palm oil and the like; animal oils, such as fish oil, lard, beef tallow and the like; fatty acids, such as α-linolenic acid, EPA, DHA and the like; flavor oils; and fat-soluble vitamins and the like. Edible waxes may also be used. These core substances are selected appropriately and can be used either individually or as a combination of two or more thereof according to the purpose. If desired, the core substance may contain seasonings, spices, emulsifying agents, coloring agents, and the like.

The flavor oils include meat flavors, fish and shell flavors such as dried bonito flavor and the like, fruit flavors, and vegetable flavors. The fat-soluble vitamins include vitamin A, vitamin D, vitamin E, vitamin F, vitamin K and the like vitamins. These flavors and vitamins may be used either individually or as a combination thereof.

The amount of the edible hydrophobic substance used is not particularly limited and is usually about 1 to 10 g per g of a capsule wall-forming protein, such as gelatin and the like.

The above-described hydrophobic core substances may be used in combination with water-soluble substances, such as proteins, amino acids, nucleic acids, enzymes and the like.

Salting-out method for preparing microcapsules, which is one of simple coacervation techniques, can be carried out as follows.

The ratio of the edible hydrophobic substance, protein, water and the like to be subjected to salting-out is not limited as far as is within the range commonly used in salting-out. A general procedure of salting-out method is described below for an illustrative purpose but not for limitation.

A 1 to 20 wt % aqueous solution of a protein (e.g., gelatin) is prepared, and 1 to 200 ml or 1 to 200 g of an edible hydrophobic substance is added thereto per 100 g of the foregoing aqueous solution and dispersed to form droplets having a particle size of about 100 to 400 μm to prepare an O/W emulsion. To the O/W emulsion was added 10 to 200 g, per 100 g of the emulsion, of distilled water of 30 to 70° C., while maintaining the temperature of the emulsion at 30 to 70° C.

A 0.5 to 30 wt % aqueous solution of an edible salt is added dropwise to the emulsion in a total amount of 10 to 200 g per 100 g of the emulsion to form a coating film (capsule wall) enveloping the edible hydrophobic substance. The system is slowly cooled to 10 to 40° C. to thicken the capsule wall. Then transglutaminase, a crosslinking agent for hardening (solidifying) the capsule wall, is added to the system. While not limiting, the enzyme reaction is usually carried out at 10 to 60° C. for 10 minutes to 48 hours. Transglutaminase is added in an amount of 0.1 to 100 units per gram of the protein (e.g., gelatin) present in the system.

In the process of hardening (solidifying) of a capsule wall by transglutaminase, methyl cellulose, carboxymethyl cellulose and the like may be added to the system in order to prevent agglomeration or caking of capsule particles. Also, in the process of encapsulation through the salting out step, substances other than the edible hydrophobic substance, protein, and edible salt may of course be added.

The resulting edible microcapsules are then dried either as is or as mixed with an antiblock agent (drying additive), such as cellulose fine powder, starch powder and the like. Drying can be carried out by any of general drying means, such as warm air drying, hot air drying, freeze drying, vacuum drying, fluidized bed drying such and the like.

The edible microcapsules according to the present invention can be added to a wide variety of foods, such as soup, chewing gum, pouch-packed foods and the like. That is, the food according to the present invention comprises the edible microcapsules, optionally also including an acceptable carrier or diluent. Foods containing the edible microcapsules of the present invention are excellent in flavor and taste.

The present invention will now be illustrated in greater detail by way of Examples, but it should be understood that the invention is not construed as being limited thereto. Unless otherwise indicated, all percents are by weight.

EXAMPLE 1

To 40 g of a 10% aqueous solution of gelatin (produced by Nippi Co., Ltd.) was added 60 ml (equivalent to about 54 g) of flavor (Orange Flavor, produced by Takasago International Corporation) and dispersed to prepare an O/W emulsion having a dispersed particle size of 200 μm. The emulsion was kept at 50° C., and 40 g of distilled water at 50° C. was added thereto. Thirty grams of a 20% aqueous solution of sodium carbonate were added to the emulsion, and 10 g thereof was further slowly added thereto dropwise thereby to form a gelatin film enveloping the flavor oil droplet by salting-out.

The system was gradually cooled to 30° C. to thicken the gelatin film, and 2 g of a transglutaminase preparation (ACTIVA® TG-S, produced by Ajinomoto Co., Inc.; containing 200 units of transglutaminase, i.e., 40 units of transglutaminase per gram of gelatin) was added thereto while keeping the system at 30° C., followed by stirring at that temperature for 2 hours and then at 40° C. overnight. The stirring was stopped, and the microcapsules were collected and dehydrated by filtration under reduced pressure by using qualitative filter paper No. 1 (produced by Toyo Roshi Co., Ltd.).

Twenty grams of crystalline cellulose fine powder which was an antiblock agent (Avicel, produced by Asahi Chemical Industry Co., Ltd.) were lightly mixed with the filter cake, and the mixture was spread over a tray and air-dried at 40° C. The resulting powder was passed through a 140 mesh screen to remove the antiblock agent as completely as possible to obtain 66 g of single-cored capsules as slightly yellowish powder. The flavor oil content of the microcapsule powder was about 70%, which corresponded to 96% of the charged flavor oil.

EXAMPLE 2

In 60 g of a 10% aqueous solution of gelatin (produced by Nippi Co., Ltd.) was dispersed 40 g of DHA oil (produced by Nihon Kagaku Siryo Co., Ltd.) to prepare an O/W emulsion having a dispersed particle size of 400 µm. The emulsion was kept at 50° C., and 70 g of distilled water at 50° C. was added thereto. Sixty grams of a 1.0% aqueous solution of sodium metaphosphate were added dropwise to the emulsion, followed by gradually cooling to 30° C. to form a thick gelatin wall around the oil droplet by salting-out.

The system was kept at 30° C., and 4 g of a transglutaminase preparation (ACTIVA®TG-B, produced by Ajinomoto Co., Inc.; containing 240 units of transglutaminase, i.e., 40 units of transglutaminase per gram of gelatin) was added thereto, followed by stirring at that temperature for 24 hours. The microcapsules thus formed were collected on a 100 mesh net, washed with water, and dehydrated by filtration under reduced pressure using the above-described qualitative filter paper No. 1. Thirty grams of starch powder were lightly mixed with the filter cake, and the mixture was spread over a tray and air-dried at room temperature. The resulting powder was passed through a 120 mesh screen to remove excess starch powder as completely as possible to obtain 69 g of single-cored capsules as white powder.

EXAMPLE 3

Microcapsules according to the present invention (sample 1) and comparative microcapsules prepared by conventional complex coacervation (sample 2) were compared in terms of (1) the volume of the coacervate, i.e., the gelatin-rich droplets and (2) the solid content of the equilibrium aqueous solution containing the non-coacervated gelatin-starved phase after coacervation.

| Preparation of Sample 2 (for comparison): | |
| --- | --- |
| 10% Gelatin aqueous solution | 60 g |
| Distilled water | 230 g |
| 10% Gum arabic aqueous solution | 60 g |

A microcapsule suspension was prepared from the above components while controlling the stirring speed, pH and cooling rate so as to obtain coacervate droplets having a particle size of about 100 µm. Four grams of a transglutaminase preparation ACTIVA® TG-B were added to the system, followed by stirring at 30° C. for 24 hours.

| Preparation of Sample 1: | |
| --- | --- |
| 10% Gelatin aqueous solution | 60 g |
| Distilled water | 70 g |
| 1% Sodium phosphate aqueous solution | 60 g |

A microcapsule suspension was prepared from the above components in the same manner as for sample 2. To the system was added 155 g of distilled water so as to give the same water content as that of sample 2, and stirring was continued for an additional period of 3 hours.

Method of Measurement

Each sample was put in a 500 ml measuring cylinder and allowed to stand for 24 hours to precipitate the coacervate, i.e, gelatin-rich droplets. The volume of the precipitated gelatin particles and the solids content of the equilibrium aqueous solution containing the non-coacervated gelatin-starved phase after coacervation were measured. The results obtained are shown in Table 1 below.

TABLE 1

| | Sample 1 (Invention) | Sample 2 (Comparison) |
| --- | --- | --- |
| Volume of gelatin particles | 134.0 ml | 166.3 ml |
| Solids content of equilibrium solution | 0.406% | 0.552% |

After the measurement, the coacervate of sample 1 having a particle size of 100 µm could be easily re-dispersed by stirring with a stirrer, whereas the coacervate of sample 2 was difficult to disaggregate on stirring.

Judging from the fact that samples 1 and 2 had substantially the same solids content in the equilibrium solution, it is seen that the gelatin charged had undergone standard phase separation and precipitated as gel. Since the obtained gelatin particles of the two samples were adjusted to have the same size, the gelatin particles were to have the same volume if the gelatin concentrations were the same. In fact, the volume of the gelatin particles of sample 1 was noticeably smaller than that of sample 2, which means the gelatin particles of sample 1 had a higher concentration.

The easy re-dispersibility of the precipitated gelatin particles of sample 1 proves that the surface of the gelatin particles of sample 1 is less sticky.

It was thus verified that the edible microcapsules according to the present invention are remarkably advantageous in drying to powder over the microcapsules formed by complex coacervation.

EXAMPLE 4

Edible microcapsules were prepared in the same manner as in Example 2, except for replacing 40 g of DHA oil with 40 g of sesame oil.

The sesame oil microcapsules were packed in a retortable pouch together with "tofu" cooked with mince and seasonings (a Chinese food) and retorted. After 3 months preservation, the pouch was opened, and the food was found still keeping a flavor of sesame.

As described above, the edible microcapsules according to the present invention have a low water content and a low degree of swelling in the capsule wall thereof and are therefore little sticky to each other. The microcapsules can be dried to single-cored microcapsule powder in a good yield and are therefore suited for preparation of dried powder of edible microcapsules. The thickness of the capsule wall is controllable with improved freedom, which eventually affords improved freedom in deciding the rate of release of the core substance.

While the invention has been described in detail and with reference to specific examples thereof, it will be apparent to one skilled in the art that various changes and modifications can be made therein without departing from the spirit and scope thereof.

This application is based on application Nos. Hei 8-850 and 8-332315 filed in Japan, the content of which is incorporated hereinto by reference.

What is claimed is:

1. Edible, single-cored microcapsules in dry, powder form, comprising:

a core; and a hardened capsule wall;

wherein said core is an edible hydrophobic substance; and said hardened capsule wall is formed by salting-out of a combination of gelatin and an edible salt, to obtain an unhardened capsule wall, followed by treating said unhardened capsule wall with transglutaminase as a crosslinking agent for hardening the capsule wall.

2. The edible, single-cored microcapsules of claim 1, wherein said edible salt is selected from the group consisting of sodium acetate, sodium sulfite, sodium sulfate, sodium metaphosphate, sodium monohydrogenphosphate, sodium dihydrogenphosphate, ammonium chloride, ammonium sulfate and mixtures thereof.

3. The edible, single-cored microcapsules of claim 1, wherein said edible hydrophobic substance is an edible oil, edible wax, fat-soluble vitamin, beef tallow or fatty acid.

4. The edible, single-cored microcapsules of claim 1, wherein said transglutaminase is calcium-dependent.

5. The edible, single-cored microcapsules of claim 1, wherein said transglutaminase is calcium-independent.

6. The edible, single-cored microcapsules of claim 3, wherein said edible oil is a vegetable oil or animal oil.

7. The edible, single cored microcapsules of claim 6, wherein said edible oil is a flavor oil comprising meat flavor, fish flavor, fruit flavor or vegetable flavor.

8. The edible, single-cored microcapsules of claim 7, having a flavor oil content of about 70%.

9. The edible, single-cored microcapsules of claim 3, wherein said fat-soluble vitamin is vitamin A, D, E, F or K.

10. The edible, single-cored microcapsules of claim 1, wherein an amount of about 1 to 10 g of said edible hydrophobic substance is used per g. of gelatin.

11. The edible, single-cored microcapsules of claim 1, wherein an amount of about 0.1 to 100 units of said transglutaminase is used per g. of said gelatin.

12. The edible, single-cored microcapsules of claim 1, wherein said edible hydrophobic substance further comprises seasonings, spices, emulsifying agents or coloring agents.

13. The edible, single-cored microcapsules of claim 1, having negligible stickiness.

14. A food, comprising the edible, single-cored microcapsules of claim 1 and optionally an acceptable carrier.

15. The food of claim 14, which is a soup.

16. The food of claim 14, which is a chewing gum.

17. The food of claim 14, which is a pouch-packed food.

18. A method for preparing edible, single-cored microcapsules in dry, powder form, comprising:

a) forming a capsule wall on a core by salting-out of a combination of a gelatin and an edible salt; and b) hardening said capsule wall with a cross-linking agent;

wherein said core is an edible, hydrophobic substance; and wherein said cross-linking agent is transglutaminase.

19. The method of claim 18, wherein said edible salt in step a) is selected from the group consisting of sodium acetate, sodium sulfite, sodium sulfate, sodium metaphosphate, sodium monohydrogenphosphate, sodium dihydrogenphosphate, ammonium chloride, ammonium sulfate and mixtures thereof.

20. The method of claim 18, wherein said transglutaminase is calcium-dependent.

21. The method of claim 18, wherein said transglutaminase is calcium-independent.

22. The method of claim 18, wherein about 1 to 10 g of edible hydrophobic substance per g. of gelatin is used.

23. The method of claim 18, wherein edible single-cored microcapsule produced has negligible stickiness.

* * * * *